Figure 1:
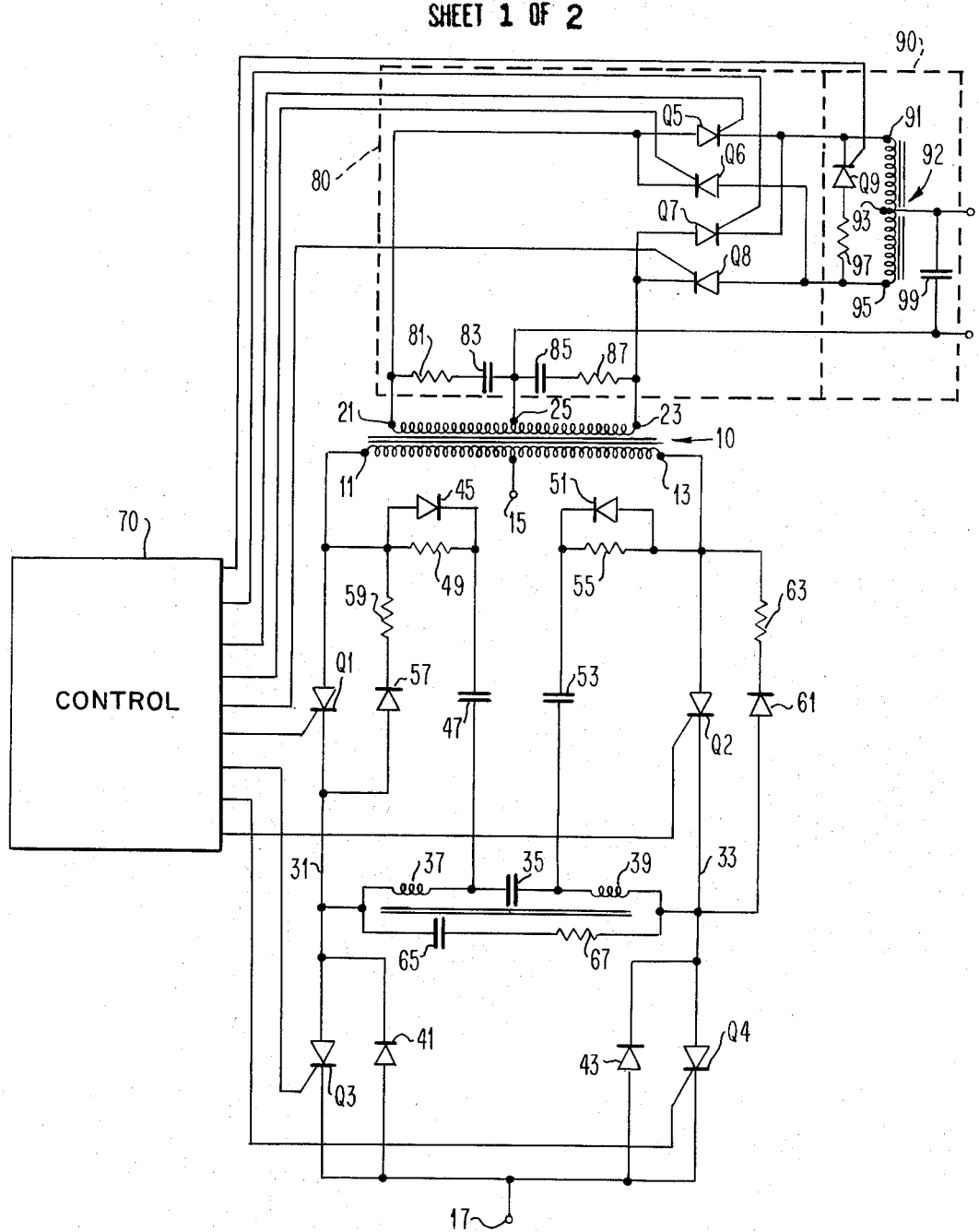

United States Patent [19]
Hoffman, Jr. et al.

[11] 3,794,906
[45] Feb. 26, 1974

[54] ELECTRICAL CONVERTER

[75] Inventors: Harry Swartzlander Hoffman, Jr., Saugerties; Kenton Hugh Knickmeyer, West Hurley, both of N.Y.

[73] Assignee: International Business Machines Corporation, Armonk, N.Y.

[22] Filed: Sept. 29, 1972

[21] Appl. No.: 293,707

[52] U.S. Cl. .................. 321/2, 321/9 R, 321/45, 321/47, 323/43.5 S
[51] Int. Cl. .......................................... H02m 3/22
[58] Field of Search ...... 307/127; 321/2, 18, 47, 69; 323/43.5 S

[56] References Cited
UNITED STATES PATENTS

| | | | |
|---|---|---|---|
| 3,579,086 | 5/1971 | Lebenbaum, Jr. | 321/69 R |
| 3,490,027 | 1/1970 | Galetto et al. | 321/2 |
| 3,246,231 | 4/1966 | Clarke | 321/69 R |
| 3,263,157 | 7/1966 | Klein | 323/43.5 S |
| 3,394,298 | 7/1968 | Logan | 321/2 |

Primary Examiner—William M. Shoop, Jr.
Attorney, Agent, or Firm—Karl O. Hesse

[57] ABSTRACT

A full wave inverter circuit having a DC input voltage and an AC output voltage of controlled fundamental frequency. Constant amplitude voltage pulses are applied to a center tapped primary winding of a transformer to generate alternating current pulses in a center tapped secondary winding of the transformer. The center tapped secondary winding is connected to a converter to convert the alternating current pulses into unidirectional positive pulses and alternately into unidirectional negative pulses which are applied to an electrical load through a filter. The width and repetition of the constant amplitude voltage pulses is varied so that the integral of the converted alternating current pulses constitutes a lower frequency alternating current output waveform.

6 Claims, 2 Drawing Figures

ELECTRICAL CONVERTER

CROSS REFERENCE TO A RELATED APPLICATION

This application is related to copending application Ser. No. 293,751 filed on September 29, 1972 of the same inventors, filed on the same date as the present application and assigned to the same assignee as the present application. The related application is hereby incorporated by reference into the present application.

BACKGROUND OF THE INVENTION

1. Field of the Invention

This invention relates to an inverter for inverting a constant DC input voltage into an AC output voltage having a controlled fundamental frequency. More particularly, this invention relates to an inverter employing controlled rectifiers in full wave pairs.

2. Description of the Prior Art

Inverters having a center tapped primary winding and alternately conducting switches driving the end taps of the primary have been known for some time, an example being disclosed in U. S. Pat. No. 3,341,767. These prior art full wave inverters have been operated at a frequency substantially equal to the desired output frequency, however, which results in heavy apparatus because the transformer must contain significant amounts of iron in order to operate without saturation at the lower electric utility frequencies.

Conversion of relatively high frequency alternating current power into lower frequency alternating current power has also been taught in the prior art. These prior art converter teachings, however, require complex transformer circuits in order to insure proper operation of the converter switches.

Generation of a lower fundamental frequency alternating current waveform from a higher frequency alternating current waveform as taught in the prior art also entails voltage amplitude modulation of the higher frequency waveform in order to provide a low frequency alternating current output waveform without excessive waveform distortion.

SUMMARY OF THE INVENTION

It is an object of this invention to generate a low frequency alternating current waveform from a DC power source using an improved inverter which contains only a small amount of iron.

It is a further object of this invention to convert high frequency alternating current pulses into a lower frequency alternating current waveform using a simple transformer and converter circuit.

It is a still further object of this invention to provide a low frequency alternating current waveform by employing an intermediate step of generating high frequency alternating current constant amplitude voltage pulses the voltage pulses being rectified and integrated by improved converting and filtering means, the width and repetition rate of the voltage pulses controlling the waveform of the low frequency alternating current being generated.

It is an even further object of this invention to convert DC power into low frequency AC power using a simple transformer having center tapped primary and center tapped secondary windings in conjunction with an improved converter and filter.

It is a still further object of this invention to convert high frequency alternating current pulses into positive and negative half cycles of a low frequency alternating current waveform using a simple controlled rectifier converter circuit.

It is a further object of this invention to integrate the high frequency converted pulses by use of a center tapped inductor and center tapped transformer winding from which the converted pulses were obtained.

It is an even further object of this invention to insure proper switching operation of a controlled rectifier converting bridge by means of a simple clamp controlled rectifier circuit.

These and further objects of the invention which will become apparent upon a reading of the specification and by reference to the attached drawings are accomplished by inverting DC power into alternating current pulses made available at the terminals of a center tapped secondary transformer winding. The width and repetition frequency of the alternating current pulses is controlled so that the integral of the rectified alternating current pulses defines a low frequency alternating current output waveform. Conversion of the alternating current pulses into positive half cycles and negative half cycles of a low frequency waveform is accomplished by a controlled rectifier bridge circuit. The output of the controlled rectifier bridge circuit is connected to a center tapped inductive filter having a clamp SCR for insuring proper switching operation of the controlled rectifier bridge. A return path for low frequency alternating current is provided to the center tap of the secondary winding of the transformer.

A PREFERRED EMBODIMENT OF THE INVENTION

Referring now to FIG. 1, apparatus will be described to allow one to make and use the invention.

In order to transform the voltage of a DC voltage source such as 60 volts into the pulse voltages necessary to generate a 220 volt alternating current waveform, a transformer 10 is provided. Transformer 10 has a center tapped primary winding having a first terminal 11, a second terminal 13, and a center tap terminal 15 connected to the positive terminal of a DC voltage source. The number of winding turns between terminals 11 and 15 is equal to the number of winding turns between terminals 15 and 13. The secondary winding of transformer 10 has a first terminal 21, a second terminal 23, and a center tap terminal 25. The number of winding turns between terminals 21 and 25 is also equal to the number of winding turns between terminals 25 and 23. The first tap 11 of the primary winding of transformer 10 is connected to the negative terminal 17 of the DC power source through a first switch means comprising silicon controlled rectifier Q1 in series with silicon controlled rectifier Q3. The anode and cathode of control rectifier Q1 is connected to terminal 11 and to first commutate node 31 respectively. Likewise the anode and cathode of control rectifier Q3 is connected to first commutate node 31 and to negative terminal 17 of the DC power source respectively.

Figure 2:
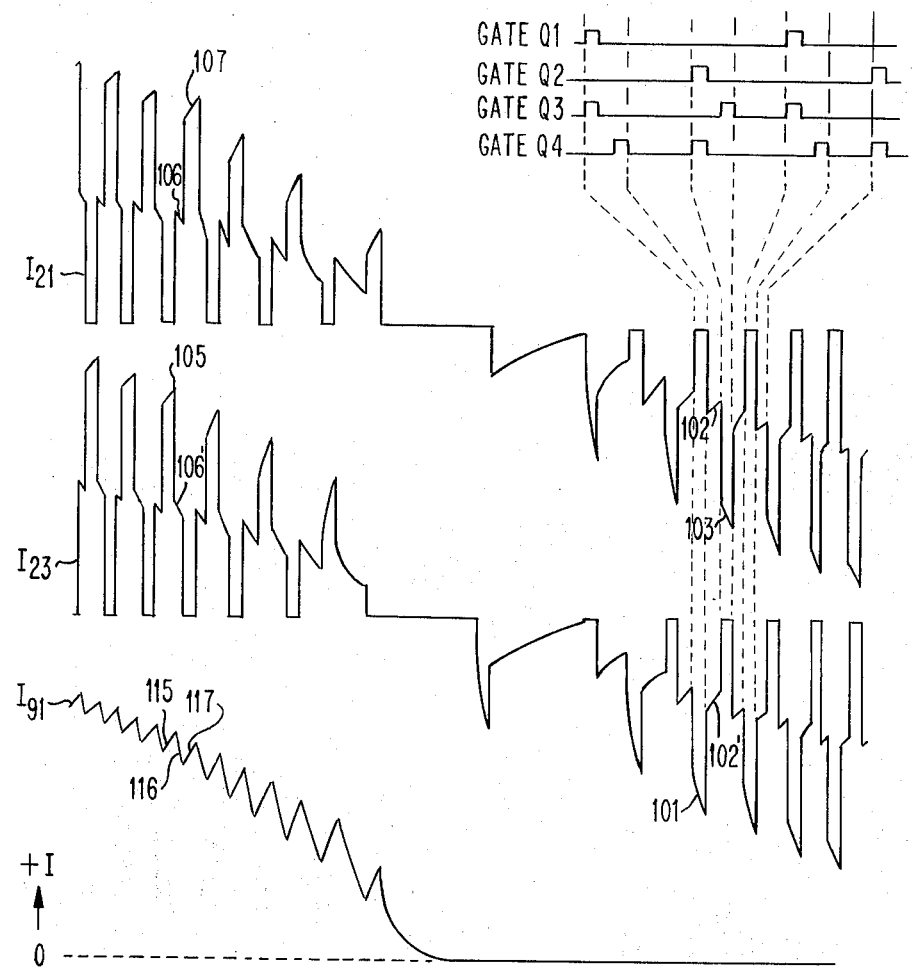
Figure 2:
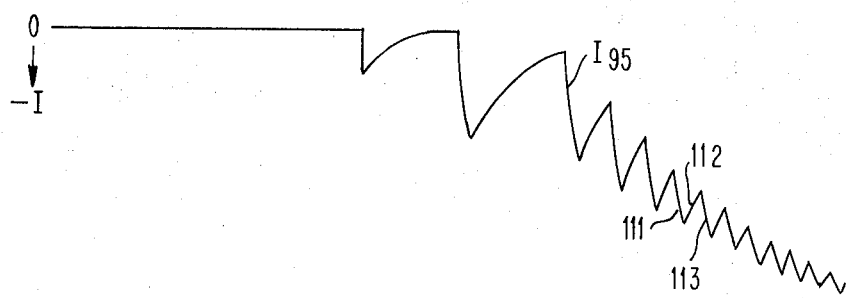

In similar fashion second switch means comprising silicon controlled rectifiers Q2 and Q4 connected in series between primary winding tap 13 and negative DC power source terminal 17. The anode and cathode of controlled rectifier Q2 is connected to primary winding tap 13 and commutate node 33 respectively. The anode and cathode of controlled rectifier Q4 is connected to commutate node 33 and negative DC power source terminal 17 respectively. The gate of each of control rectifiers Q1, Q2, Q3, and Q4 is connected to control means 70. Control means 70 may be the control means disclosed in copending application Ser. No. 293,751 filed on September 29, 1972. Representative timing of signals provided by control 70 is shown in FIG. 2 as digital waveforms labeled GATE Q1, Q2, Q3, Q4, GATE Q5 and Q7, GATE Q6 and Q8, as well as GATE Q9.

In order to turn off controlled rectifiers Q3 or Q4, a commutate network including inductor 37, capacitor 35, and inductor 39 is connected in series between commutate node 31 and commutate node 33. The inductors and capacitor of the commutate circuit comprise a resonant circuit to generate a half sine wave commutate current waveform. For purposes of explanation, assume that controlled rectifiers Q1 and Q3 are being turned off. Before the half sine wave commutate current waveform reaches its peak value, a current equal to the current which had been flowing through controlled rectifier Q3 will be drawn out of commutate node 31 causing Q3 to turn off. In order to allow the current in the commutate circuitry to continue to rise to a peak value, diode 41 having an anode connected to the negative terminal 17 of the DC power source and a cathode connected to commutate node 31 is provided. When the commutate current returns to the current being drawn from primary winding tap 11, inductor 92 of filter 90 is reflected through transformer 10 as a series impedance thereby increasing the time constant of the circuit. The voltage on capacitor 35 will continue to charge, and when it reaches the value of the DC power source, inductor 92 is decoupled from the commutate circuitry and controlled rectifier Q1 begins to turn off. Commutate current continues to decay through controlled rectifier Q1 and Q4 until it drops below the holding current value allowing the control rectifiers to turn off.

In like manner, diode 43 provides a circulating path for commutate current when controlled rectifier Q3 is turning controlled rectifiers Q2 and Q4 off.

In the event that the current being drawn through inductor 92 is very small, the energy added to the commutate circuit during each switching cycle will be less than the energy dissipated due to circuit losses. This low current condition occurs every time the low frequency output waveform crosses zero voltage. In order to restore energy to capacitor 35 every time a current pulse is generated in transformer 10, a series charge path is provided from a primary winding tap of transformer 10. For example, when control rectifiers Q1 and Q3 are conducting, the voltage at primary winding tap 11 is pulled down and primary winding tap 13 is at a positive voltage approximately equal to twice the voltage of the DC power source. To charge capacitor 35, primary winding tap 13 is connected to the anode of diode 51 which has a cathode connected through capacitor 53 to the node between capacitor 35 and inductor 39. Charging current thus flows from primary winding node 13 through capacitor 35 and controlled rectifier Q3 to negative terminal 17 of the DC power source. In like manner whenever controlled rectifiers Q2 and Q4 are conducting charging current flows through diode 45 and capacitor 47 to charge capacitor 35, in the opposite direction. In order to allow capacitors 47 and 53 to return to a quiescent voltage after charging capacitor 35, resistors 49 and 55 are connected across diodes 45 and 51 respectively.

In order to prevent excessive voltage spikes from appearing across controlled rectifiers Q1 and Q2, the anode of diode 57 is connected to the cathode controlled rectifier Q1 and the cathode of diode 57 is connected through resistor 59 to the anode of controlled rectifier Q1. Likewise the anode of diode 61 is connected to the cathode of controlled rectifier Q2 and the cathode of diode 61 is connected through resistor 63 to the anode of controlled rectifier Q2. A series path from commutate node 31 through capacitor 65 and resistor 67 to commutate node 33 is provided to prevent voltage spikes from occurring due to switching current through inductive elements.

In order to convert the alternating current pulses generated in the secondary winding of transformer 10 into positive half cycles and negative half cycles of the low frequency output waveform, converter 80 is provided. Converter 80 includes controlled rectifiers Q5 and Q7 which convert alternating current pulses into positive unidirectional pulses. The anodes of controlled rectifiers Q5 and Q7 are connected to the secondary winding taps 21 and 23 of transformer 10 respectively. The cathodes of controlled rectifiers Q5 and Q7 are connected together and to a positive input of filter 90 to provide the unidirectional current pulses defining the positive half cycle of the output waveform. In like manner, the cathode of controlled rectifiers Q6 and Q8 are connected to secondary winding taps 21 and 23. The anodes of controlled rectifiers Q6 and Q8 are connected together and connected to a negative input to filter 90 for providing unidirectional current pulses defining the negative half cycle of the output waveform. In order to prevent unwanted conduction of controlled rectifiers Q5 Q6,Q7, and Q8 due to excessive dv/dt, a high frequency filter comprising resistor 81 and capacitor 83 and comprising capacitor 85 and resistor 87 are connected between secondary winding taps 21 and 25 and taps 25 and 23, respectively.

In order to integrate the positive unidirectional pulses and negative unidirectional pulses which define the positive and negative half cycles of the output waveform, respectively, an inductor 92 is provided within filter 90. Inductor 92 has a first tap 91, a center tap 93, and a second tap 95. The first tap 91 of inductor 92 is connected to the cathodes of controlled rectifiers Q5 and Q7 as well as the cathode of controlled rectifier Q9. In a similar manner, winding tap 95 of inductor 92 is connected to the anodes of controlled rectifiers Q6 and Q8 and to the anode of controlled rectifier Q9 through resistor 97. The output waveform provided by the invention appears at the center tap 93 of inductor 92. The center tap 93 is also connected to one terminal of filter capacitor 99. The second terminal of filter capacitor 99 is connected to the return current path to secondary winding center tap 25 of transformer 10.

OPERATION OF THE PREFERRED EMBODIMENT

Referring now to FIG. 2, a plurality of waveforms at various points within the circuitry of FIG. 1 is shown. Time is portrayed on the horizontal scale in all of the waveforms. The time scale for waveforms labeled gate Q1 through Q7 has been expanded to more clearly show the sequence in which controlled rectifiers Q1 through Q4 are energized in order to provide alternating current pulses at the secondary winding of transformer 10. A first alternating current pulse is initiated by gating controlled rectifiers Q1 and Q3 on causing current to flow from the positive terminal 15 of the DC power source through half of the primary winding of transformer 10 to tap 11 and back out through controlled rectifiers Q1 and Q3 to the negative terminal 17 of the DC power source. The first switch means Q1 and Q3 are turned off through the commutate circuitry by gating controlled rectifier Q4 on. The current which previously flowed through controlled rectifier Q3 now flows through Q4 causing controlled rectifier Q3 to turn off. The capacitors of the commutate circuit prevents current from continuing to indefinitely flow through control rectifiers Q1 and Q4 to the negative terminal 17 of the DC power supply and, therefore, the current through controlled rectifiers Q1 and Q4 eventually drops below the holding current value allowing them to turn off. The next alternating current pulse is generated by gating controlled rectifiers Q2 and Q4 on. The next alternating current pulse is terminated by gating controlled rectifier Q3 on thereby commutating current away from controlled rectifier Q4 and turning controlled rectifier Q4 and controlled rectifiers Q2 and Q3 off. Reference to waveform $I_{23}$ of FIG. 2 shows that a current pulse 101 was drawn into secondary winding tap 23 during the above described first alternating current pulse. Likewise a current pulse 103 of waveform $I_{21}$ was drawn into secondary winding tap 21 during the above described next alternating current pulse. Current was prevented from flowing out of secondary winding tap 21 while current was being drawn into secondary winding tap 23 because control rectifiers Q5 and Q7 are gated off during the negative half cycle which is being generated by pulses 101 and 103. Reference to the GATE Q6 and Q8 waveform of FIG. 2 shows that controlled rectifiers Q6 and Q8 are conductive, however, allowing current to flow into secondary winding tap 21 and 23 to form a negative half cycle, a return current path being provided out of secondary winding center tap 25.

In a similar manner, whenever controlled rectifiers Q5 and Q7 are gated on, controlled rectifiers Q6 and Q8 will be gated off. Therefore, an alternating current pulse generated at the secondary of transformer 10 by turning control rectifiers Q1 and Q3 on will provide a current pulse 105 out of secondary winding tap 23. Likewise, whenever controlled rectifiers Q2 and Q4 are turned on, a current pulse 107 will be provided out of secondary winding tap 21. Thus it can be seen that alternately gating controlled rectifiers Q5 and Q7 or Q6 and Q8 will generate current pulses 105 and 107 or 101 and 103, respectively, thereby forming positive and negative half cycles of the output waveform.

Waveform $I_{91}$ shows directional current pulses 115 and 117 which are the same as current pulses 105 and 107 after they have been converted by converter 80 and partially filtered by the inductor 92 of filter 90. Each rising portion of the waveform $I_{91}$ corresponds to a current pulse received from the secondary winding of transformer 10 to store energy in inductor 92 of filter 90. Each falling portion of waveform $I_{91}$ corresponds to periods of time when no current pulses are being generated and, therefore, energy is being released by inductor 92 of filter 90. Hence, after current pulses 105 and 107 have caused current to flow through controlled rectifiers Q7 and Q5, respectively, into node 91 of inductor 92, inductor 92 will continue to draw current into winding tap 91 and drive current out of center tap 93 to the load. The return current from the load flows into secondary winding center tap 25 of transformer 10. Due to the small resistance of the secondary winding, the return current splits so that half of the return current flows out of winding tap 21 and the other half out of winding tap 23 when no current pulses are being provided. Thus, decaying current 116 into secondary winding center tap 25 flows out as current 106 and 106' from secondary winding tap 21 and 23 as shown in waveforms $I_{21}$ and $I_{23}$ respectively.

To the extent that residual flux remains in transformer 10 from the generation of current pulse 105, the current 106 from $I_{21}$ will exceed current 106' of waveform $I_{23}$. Magnetizing currents are usually small and for purposes of design may be neglected.

Reference to waveform $I_{95}$, which shows current out of inductor winding tap 95, shows that each negative half cycle is generated in the same way as each positive half cycle. Increasing current portions 111 and 113 of wavefore $I_{95}$ correspond to current pulses 101 and 103 into secondary winding taps 23 and 21, respectively. Inasmuch as the current into or out of inductor winding center tap 93 is the sum of currents into and out of inductor winding taps 91 and 95, respectively, the output current at inductor winding center tap 93 is the sum of waveforms $I_{91}$, $I_{95}$. Note that during the period of time when controlled rectifier Q9 is gated on, a current is flowing into inductor winding tap 91 which is equal to the current which is flowing out of inductor winding tap 95. Thus, current does not flow into or out of inductor winding center tap 93 and capacitor 99 decays toward zero voltage in preparation for changing from a positive half cycle to a negative half cycle.

In the event that the current flowing out of inductor winding center tap 93 was flowing into an inductive load, the current out of tap 93 will be lagging the voltage at tap 93, thereby increasing the magnitude of the current being drawn through the inductor winding. In this event, an increased amount of energy is stored in inductor 92 in the form of a magnetic field as the positive half cycle is ending. Inasmuch as controlled rectifier Q9 is conducting, a current path is provided from conductor winding tap 95 to tap 91 to allow a circulating current to retain the energy in inductor 92. The energy retained within inductor 92 from the end of the positive half cycle is released at the beginning of the negative cycle when controlled rectifier Q9 becomes non-conducting as the first current pulse is received from the secondary winding of transformer 10. Energy is released from inductor 92 to the inductive load by virtue of the fact that a substantial current is already flowing in inductor 92 when the first current pulse is received from transformer, and the current in inductor 92 is added to the current pulse received from transformer 10. If it is desired to absorb reactive power from an inductive load, the resistance of resistor 97 is increased. Increasing the resistance of resistor 97 causes the current in inductor 92 at the end of each half cycle to decay to zero before the next half cycle begins. Therefore, the resistance and power dissipation of resistor 97 controls the amount of power which can be absorbed from a reactive load by the DC to AC inverter of the invention.

In addition to providing for energy storage within inductor 92, controlled rectifier Q9 provides a circulating current path around inductor 9 so that the voltage applied to controlled rectifiers Q5 and Q7 or Q6 and Q8 will cause them to turn off prior to or at the beginning of the next half cycle so that there is no danger of all four rectifiers Q5 through Q8 being on simultaneously. The first current pulse of a half cycle acts to back bias control rectifier Q9. Therefore, control rectifier Q9 turns off at the beginning of each half cycle if current through inductor 92 has not earlier decayed to zero.

While the invention is particularly shown and described with reference to a preferred embodiment thereof, it will be understood by those skilled in the art that changes in form and detail may be made therein without departing from the spirit and scope of the invention.

What I claim is:

1. An alternating current waveform generator comprising
   a source of unidirectional power pulses in one direction for defining one half cycle of a waveform;
   another source of unidirectional power pulses in another direction for defining a second half cycle of said waveform;
   an inductor winding having a first tap connected to said source, a second tap connected to said another source and a center tap for providing said alternating current waveform;
   controlled conducting means connected between said first tap and said second tap;
   control means connected to a control input of said controlled conducting means rendering said conducting means conductive as each half cycle of said alternating current waveform is ending to allow energy stored in said inductor during one of said half cycles to be retained in said inductor and released from said inductor during a next half cycle thereby substantially preventing unwanted waveform distorting voltages from being developed.

2. The waveform generator of claim 1 wherein said controlled conducting means is a controlled rectifier.

3. The inverter of claim 2 further comprising a resistor connected in series with said controlled rectifier between said first and second taps for dissipating energy.

4. A DC to AC inverter comprising:
   a transformer having a primary and a secondary winding, each of said windings have first and second taps and a center tap, said center tap of said primary winding being connected to a first terminal of a DC power source;
   a first switch means connected between said first primary winding tap and a second terminal of said DC power source;
   a second switch means connected between said second primary winding tap and said second terminal of said DC power source;
   control means connected to said first and to said second switch means for alternately causing said first and second switch means to be conductive for predetermined periods of time whereby alternating current pulses are produced in said second winding;
   first and second controlled rectifiers, the anodes of said first and second controlled rectifiers being connected to said first and second taps of said secondary winding respectively, the cathodes of said first and second controlled rectifiers being connected together for providing unidirectional current pulses in one direction,
   third and fourth controlled rectifiers, the cathodes of said third and fourth controlled rectifiers being connected to said first and and second taps of said secondary winding respectively, the anodes of said third and fourth controlled rectifiers being connected together for providing said unidirectional current pulses in another direction,
   the control inputs of each of said controlled rectifiers being connected to said control means for rendering said first and second controlled rectifiers conductive and said third and fourth controlled rectifiers non-conducting, and alternately for rendering said third and fourth controlled rectifiers conductive and said first and second controlled rectifiers non-conducting;
   an inductor winding having first and second taps and a center tap, said first and second taps connected to said cathodes of said first and second controlled rectifiers and to said anodes of said third and fourth controlled rectifiers respectively, said center tap providing said alternating current waveform;
   a fifth controlled rectifier having a cathode and an anode connected to said first tap and to said second tap of said inductor winding respectively, a control input of said fifth controlled rectifier connected to said control means for rendering said fifth controlled rectifier conductive whenever said first and second and whenever said third and fourth controlled rectifiers are to be rendered non-conducting, said fifth controlled rectifier providing a current path around said inductor winding to allow energy stored in said inductor during one half cycle of said alternating current waveform and energy transferred to said inductor from a load having a non-zero power factor to be retained in said inductor and released from said inductor during the next one half cycle of said alternating current waveform and preventing excessive voltages from being generated.

5. The inverter of claim 4 further comprising:
   a resistor connected in series with said fifth controlled rectifier between said first and second taps for dissipating energy.

6. The method of generating a waveform comprising the steps of:
   repeatedly generating a plurality of high frequency alternating current pulses, the width and repetition frequency of said current pulses defining one half cycle of a lower frequency waveform;
   rectifying alternately generated ones of said repeatedly generated plurality of alternating current pulses in a positive direction to provide positive half cycles of said waveform;
   rectifying other alternately generated ones of said repeatedly generated plurality of alternating current pulses in a negative direction to provide negative half cycles of said waveform;
   repeating said rectifying steps in sequence to continue to provide positive and negative half cycles in sequence;
   filtering each of said positively rectified current pulses through a first input of a center tapped winding of an inductor;

filtering each of said negatively rectified pulses through a second input of said inductor winding, a center tap of said inductor winding being an output of said inductor for providing said waveform;

providing an energy dissipating conductive path from said second input to said first input of said inductor winding at the end of each of said half cycles to allow energy stored in said inductor during each half cycle to be dissipated thereby substantially preventing distortion by said inductor of said waveform being generated.

* * * * *